No. 753,231. PATENTED MAR. 1, 1904.
A. CAMERON.
MACHINE FOR MAKING AND REPAIRING ROADS.
APPLICATION FILED JULY 9, 1903.
NO MODEL. 5 SHEETS—SHEET 3.
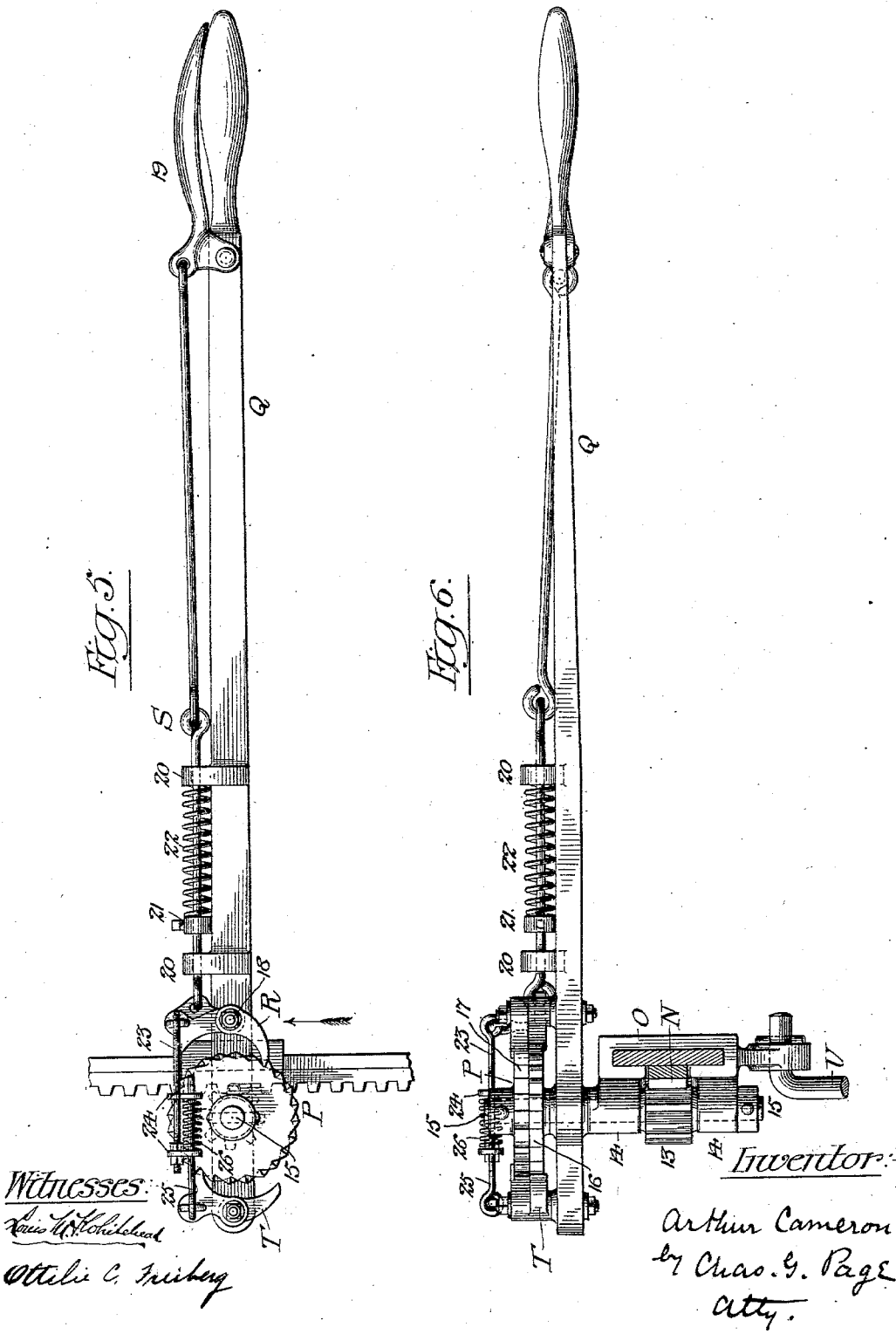

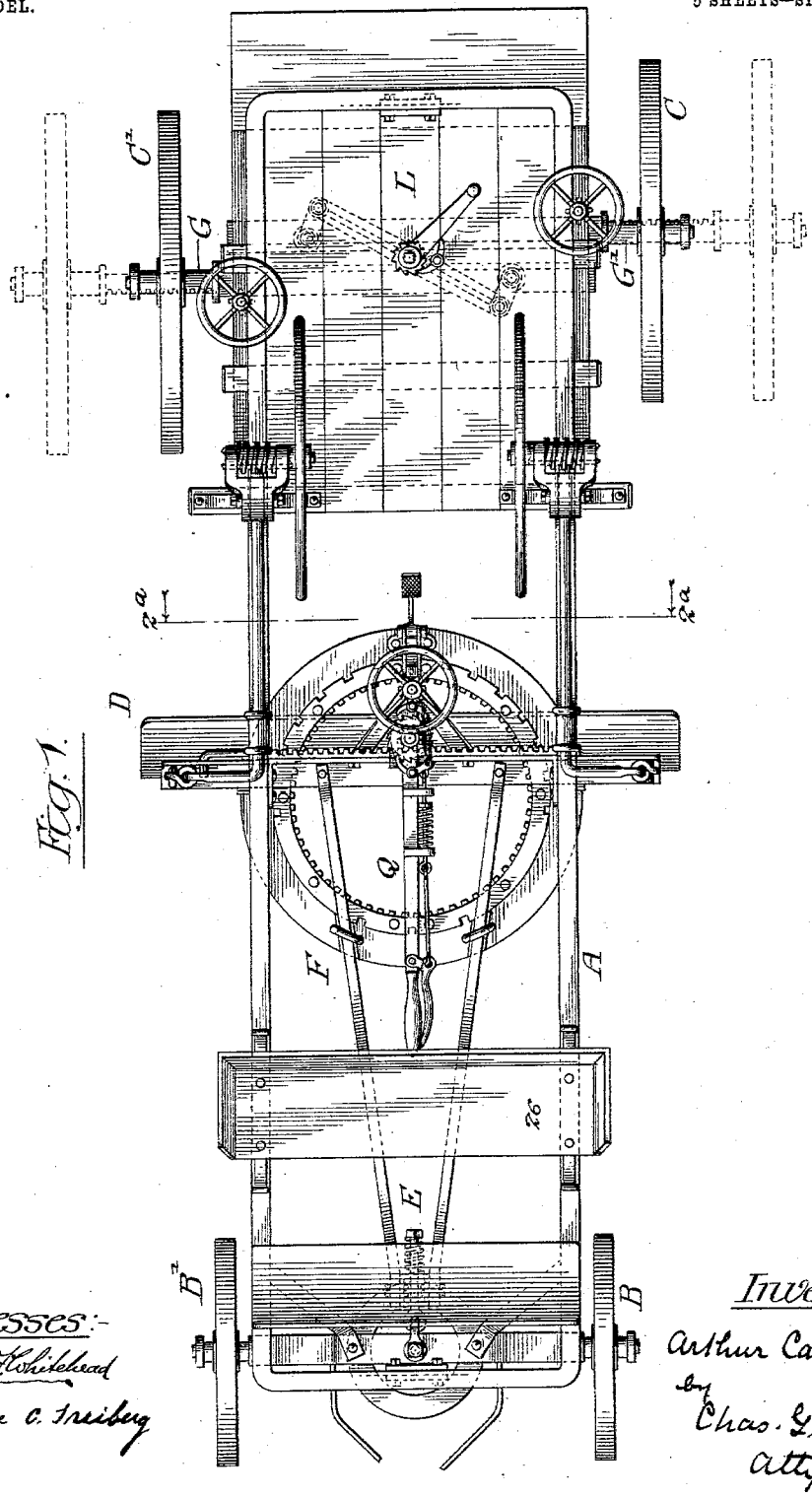

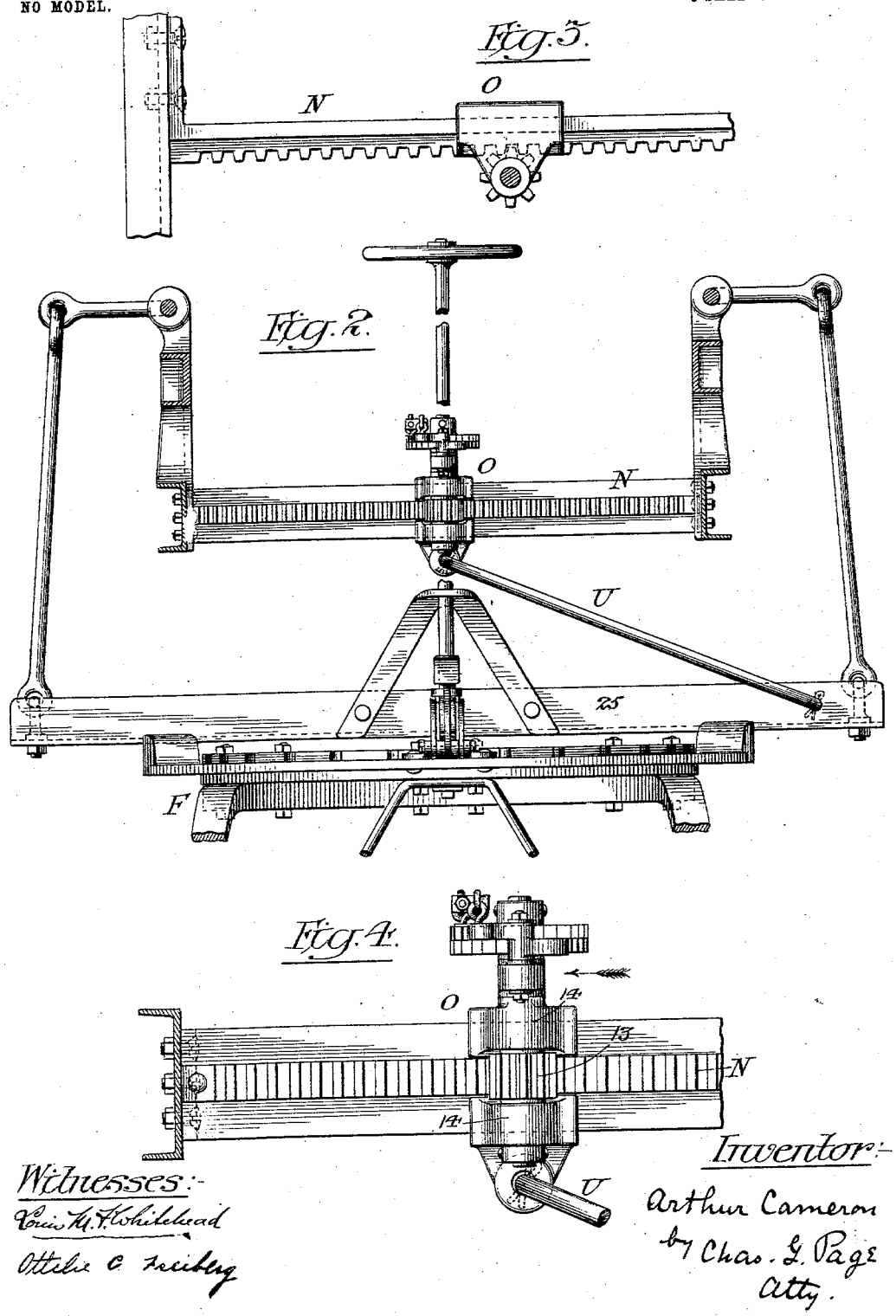

No. 753,231. PATENTED MAR. 1, 1904.
A. CAMERON.
MACHINE FOR MAKING AND REPAIRING ROADS.
APPLICATION FILED JULY 9, 1903.
NO MODEL. 5 SHEETS—SHEET 4.
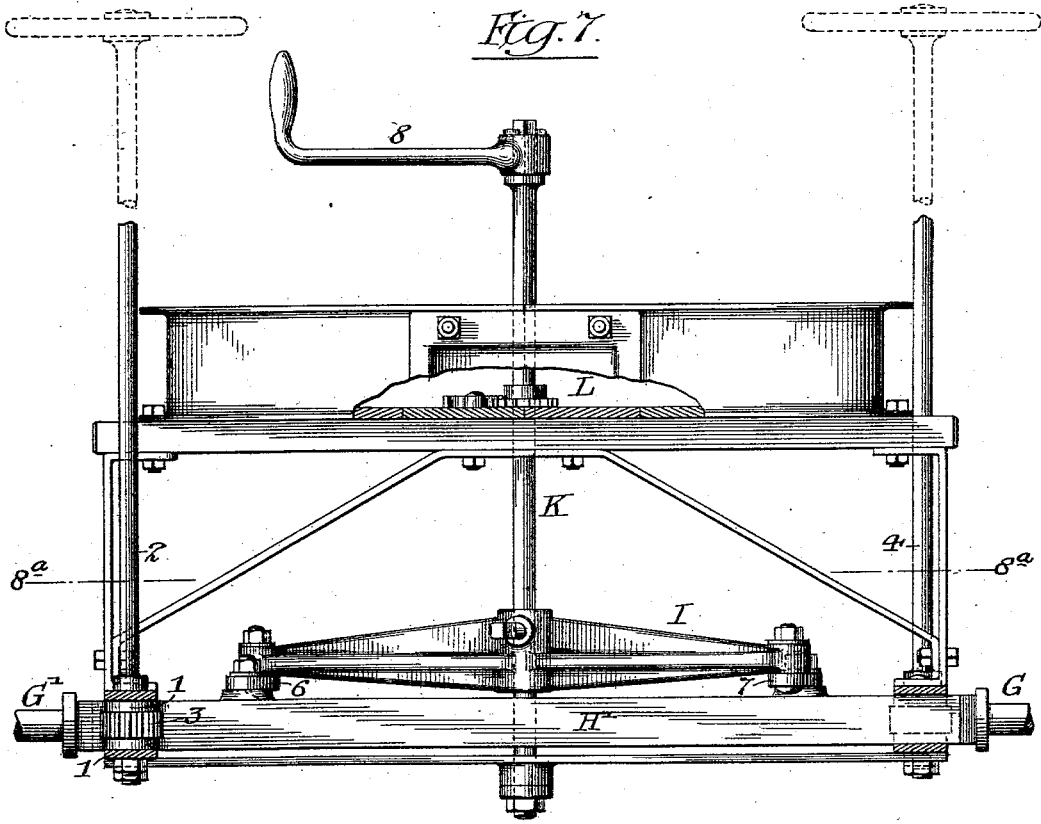
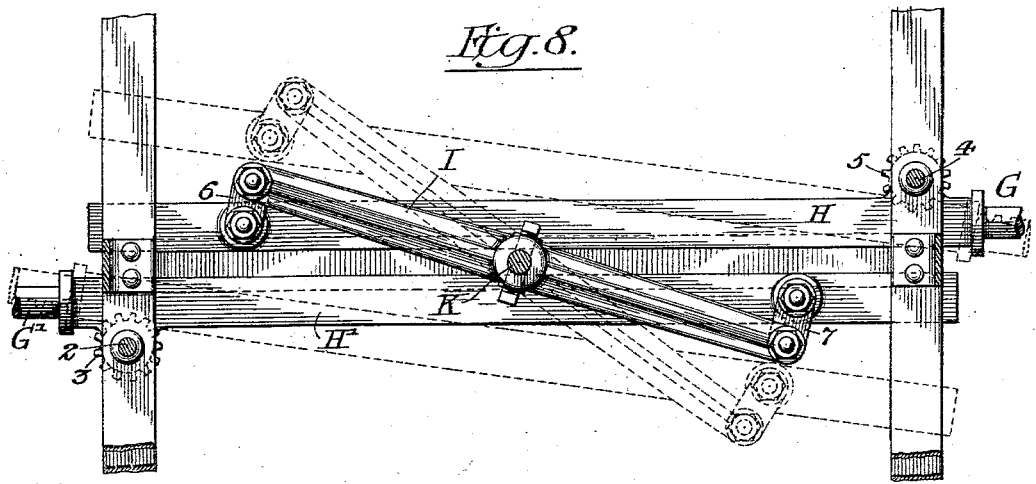

No. 753,231. PATENTED MAR. 1, 1904.
A. CAMERON.
MACHINE FOR MAKING AND REPAIRING ROADS.
APPLICATION FILED JULY 9, 1903.
NO MODEL. 5 SHEETS—SHEET 5.
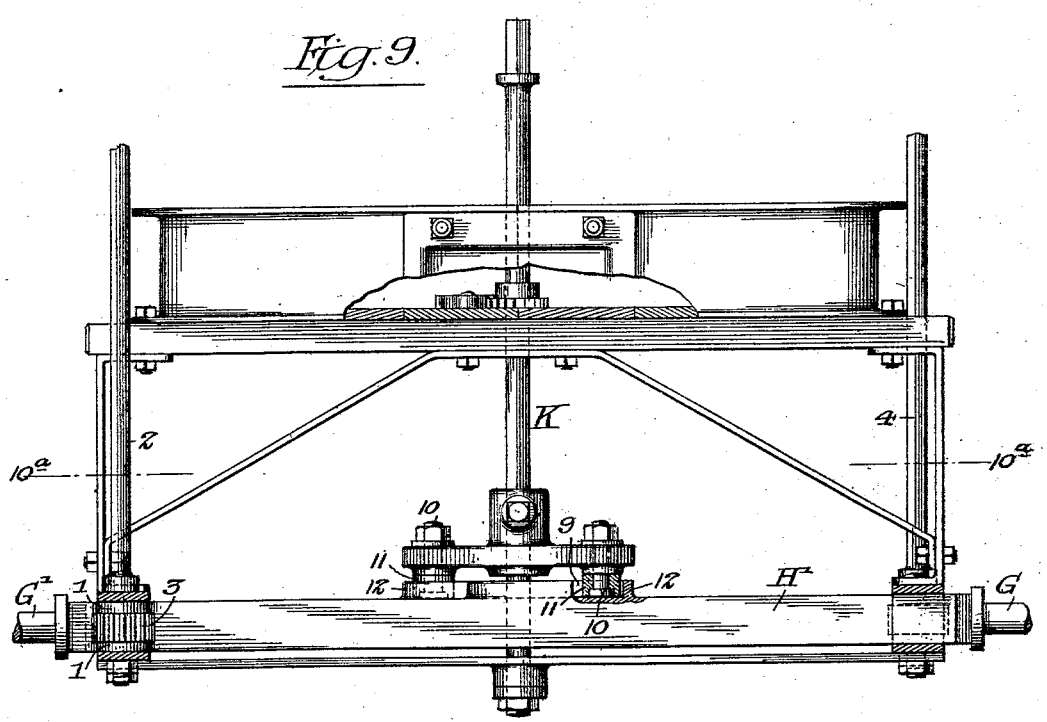
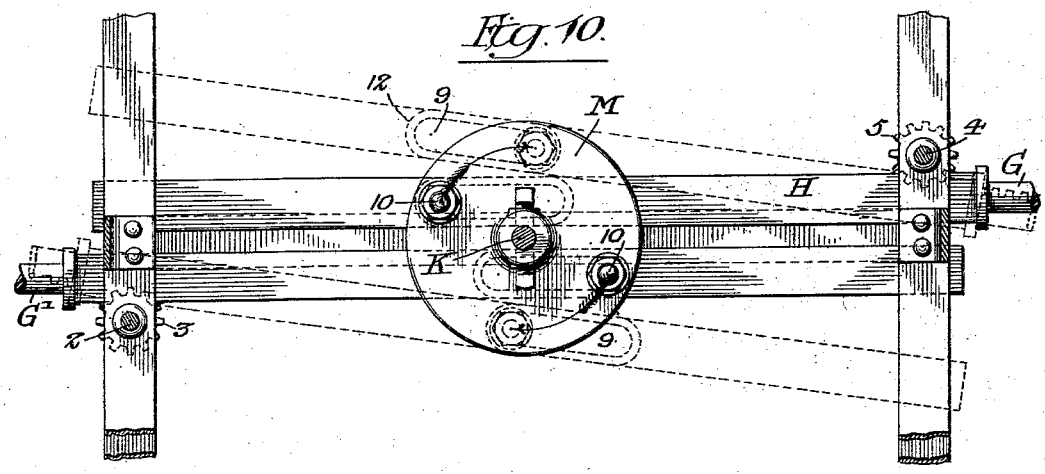
Witnesses:—
Louis M. F. Whitehead
Ottilie C. Friberg
Inventor:
Arthur Cameron
by Chas. L. Page
Atty.

No. 753,231.

Patented March 1, 1904.

UNITED STATES PATENT OFFICE.

ARTHUR CAMERON, OF CHICAGO, ILLINOIS, ASSIGNOR TO NATIONAL DRILL AND MANUFACTURING COMPANY, OF CHICAGO, ILLINOIS, A CORPORATION OF WEST VIRGINIA.

MACHINE FOR MAKING AND REPAIRING ROADS.

SPECIFICATION forming part of Letters Patent No. 753,231, dated March 1, 1904.

Application filed July 9, 1903. Serial No. 164,906. (No model.)

*To all whom it may concern:*

Be it known that I, ARTHUR CAMERON, a citizen of the United States, residing at Chicago, in the county of Cook and State of Illinois, have invented certain new and useful Improvements in Machines for Making and Repairing Roads, of which the following is a specification.

In Letters Patent of the United States to Jay B. Rhodes and Bert O. Rhodes, dated March 31, 1903, and numbered 724,042, the rear supporting-wheels have separate axle portions arranged for independent longitudinal adjustment and pivotally connected with the body-frame of the machine respectively at opposite sides of a point between the rear wheels, the separate axle portions thus arranged having shifting connections with swinging boxes or bearings which are pivoted to the body-frame, so as to practically pivotally connect such shifting axle portions with the body-frame, as above stated. As a result of such arrangement the spread of the rear wheels can be varied and each rear-axle portion can be adjusted longitudinally and independently, and regardlesss of the horizontal swing of such axle portions for the purpose of skewing the rear wheels said rear-axle portions will maintain a condition of relative parallelism.

A feature of my invention consists in simplified means for swinging the longitudinally-adjustable rear-axle section, the device shown in said patent for thus swinging the rear-axle sections being a chain engaging the free ends of swinging bearings or boxes with which the rear-axle portions have sliding connections and means for operating such chain in opposite direction in alternation.

A further feature of my invention consists in simplified and improved means for laterally shifting toward either side of the machine a suspended support for the scraper-blade.

In the accompanying drawings, Figure 1 is a top plan view of a machine for making and repairing roads embodying the principles of my invention. Fig. 2 is a section on line 2ª 2ª in Fig. 1, portions of the machine being broken away for convenience of illustration. Fig. 3 is a detail showing in plan view a portion of a rack-bar and shifting device thereon, said shifting device being included in mechanism for laterally shifting the scraper-blade support. Fig. 4 is a detail showing in elevation a portion of the rack illustrated in Fig. 3 and further illustrating the shifting device and a portion of the shifting mechanism. Fig. 5 is an enlarged plan view of the major portion of the mechanism for laterally shifting the scraper-blade support. Fig. 6 shows the mechanism of Fig. 5 in side elevation. Fig. 7 is a rear end elevation of a portion of the machine, a part of the main frame being broken away for convenience of illustration. Fig. 8 is a top plan view mainly illustrating a device for swinging the rear-axle portions. In this view the vertical rotary shafts illustrated in Fig. 1 are shown in cross-section. Fig. 9 is a view similar to Fig. 7, illustrating a modified form of device for swinging the rear-axle portions. Fig. 10 is a top plan view of said modified device for swinging the rear-axle portions, the several rotary shafts being in section on line 10ª 10ª.

The body-frame A of the machine is supported by a pair of front wheels B B' and a pair of rear wheels C C'. The transversely-arranged scraper-blade D is supported between the front and rear wheels and pivotally connected in any suitable way with a draft attachment or draw-bar E, which is in turn connected with the forward portion of the machine, the rear end of the said draw or draft bar, whether single or divided, being connected with any suitable or desired support or carrier F for the scraper-blade, by which arrangement the carrier F can be moved as a whole toward either side of the machine, so as to project the scraper-blade from one or the other side of the body-frame in accordance with well-known requirements. The rear wheels C C' are respectively arranged upon longitudinally-adjustable and swinging axle portions or sections G G'. These rear-axle portions are respectively pivotally connected with the body-frame at opposite sides of a point between the rear wheels, and in order to thus provide shifting pivotal connections between the rear-axle portions and the body-frame the axle portion G is arranged to slide longitudinally within a box or bearing H, Figs. 8 and 10, which is pivoted to one side portion of the body-frame, and the axle portion G' is arranged to slide longitudinally in a similar box or bearing H', which is pivoted at the opposite side of the body-frame. As shown, for example, in Fig. 7, the box or bearing H' is provided at one end with eyes 1 for a pivot, which may, for example, be rotary shaft 2, having a pinion 3, which engages a rack on the axle portion in the box H, as in the patent hereinbefore referred to, and in like manner the box H can be attached to the body-frame by a pivot consisting of a rotary rod or shaft 4, having a pinion 5, which engages a rack on the axle portion G, it being understood that these boxes H and H' have suitable side openings, so that the pinions 3 and 5 may engage the racks on the rear-axle portions.

As thus far described the rear-axle portions and the swinging bearings or boxes with which they have sliding connections are substantially the same as in said patent. In order, however, to swing the rear-axle portions for the purpose of skewing the rear wheels and at the same time maintain these rear-axle portions in a condition of relative parallelism, I support upon the body-frame an oscillatory member which connects with the boxes or bearings H H' at opposite sides of the point about which it oscillates and attach this oscillatory member to the said boxes or bearings by yielding or self-adjusting connections which insure a condition of parallelism between the two axle portions.

In Figs. 7 and 8 the oscillatory member I consists of a bar or a pair of connected arms arranged to oscillate about a vertical axis between the outer ends of such arms, the outer end of one arm being connected with the free end portion of the axle box or bearing H by a link 6 and the outer end of the other arm being connected with the opposite free end portion of the box or bearing H' by a similar link 7. The bar thus providing a pair of arms is operated by a vertically-arranged rotary shaft K, supported upon the body-frame and having a hand-wheel or crank-handle 8 within convenient reach of an attendant standing upon the rear platform L. This shaft K can be turned in opposite directions in alternation according to the desired relative positions of the rear wheels, and by reason of the link connections between the oscillatory device and the axle-box the latter will always remain parallel. In Fig. 8 the axle-boxes are shown in full lines at right angles to the length of the body-frame and in dotted lines oblique thereto, it being understood that the shifting of the axle-boxes from one to the other of these positions is accomplished by simply swinging the vibratory or oscillatory device I, which connects with the axle-boxes, respectively, at opposite sides of the axis of the rotary shaft K.

In Figs. 9 and 10 the oscillatory member M for swinging the rear-axle portions consists of a plate having shifting pivotal connections with the axle-boxes, each of such shifting pivotal connections being practically formed by a stud or small roll on one member engaging in a slot or way in or on the other member. For example, each axle-box can have a longitudinal slot or way for a stud or the like on the oscillatory member M. As indicated in Fig. 10, the axle-boxes have slots or ways 9 formed upon them and the oscillatory plate M is provided with a couple of downwardly-projecting studs 10, carrying small rolls 11, Fig. 9, which engage in the slots or ways 9. These slots or ways are illustrated by dotted lines in Fig. 10, while in Fig. 9 one of such ways is shown formed upon the axle-box H', which latter is partly broken away, so as to illustrate the guideway thereon. In other words, each axle-box may, for example, have upon its top side an oblong raised portion 12, adapted to form one of the guide ways or slots 9. The plate M is secured to a rotary shaft K, corresponding with shaft K in Figs. 7 and 8. By these arrangements the objectionable features incident to the chains is avoided and there will practically be no lost motion. When the oscillatory device M is operated, it will necessarily swing the axle-boxes during such operation, and its studs or rolls will shift along the slots or ways in or on the axle-boxes, thereby keeping the latter parallel, it being observed that these studs or rolls are at opposite sides of the axis about which the plate M oscillates.

When, for example, the oscillator I is employed and is turned or swung about a vertical axis intermediate of its connections with the swinging extensible rear-axle portions or sections, the space between these extensible axle portions will be widened or contracted in width, according to the direction in which the oscillator is turned, and during such movements the links 6 and 7, which are pivoted to the oscillator and to the housings or pivoted sections H H' of the axle portions, will act as yielding self-adjusting connections, permitting the required action and at the same time preserving a condition of parallelism between the extensible axle portions. When the oscillator M is employed, the action will be substantially the same, the shifting pivotal connections between the oscillator and the housings or sections H H' permitting such action and keeping the extensible axle portions relatively parallel. Manifestly the plate M is, in effect, a bar or an oblong plate pivoted between its ends and having its ends provided with studs or the like engaging in slots or ways in or on the housings H and H', and hence it is substantially the same in principle as the bar I, the difference in details of application being its special connection with the said housings. In both instances, however, the connections between the oscillator and the housings or non-sliding parts of the extensible swinging rear-axle portions are self-adjusting power-transmitting connections which accommodate themselves to the relative positions of the axle portions and the oscillator.

The support or carrier F for the scraper-blade can be of any well-known or desired construction suitable for the purposes for which it is intended, the construction illustrated being substantially the same as in the patent hereinbefore referred to, and therefore not requiring special description as to details. This support or carrier is also shown suspended, as in said patent, so that it can be raised and lowered and also be shifted toward either side of the machine. With reference to my improved device for thus laterally shifting the support or carrier for the scraper-blade D the body-frame of the machine is provided with a transversely-arranged rack-bar N, which is rigidly secured at its ends to opposite side portions of the body-frame and adapted to form a track or guide support for a slide or shifting bearing O, which is best shown in Figs. 3 and 6. The bearing O, which is thus supported to shift transversely to the length of the machine, is provided with a pinion 13, arranged to engage the toothed portion of the rack-bar N, so that when this pinion is operated it will cause the bearing O to slide along the rack-bar in a direction determined by the direction in which the pinion is revolved. As a simple and effective construction the bearing O is shaped like a clevis, as in Fig. 6, so as to embrace and slide upon the untoothed portion of the rack-bar N and also to provide it with upper and lower bearing portions 14 for a rotary spindle 15, upon which the pinion 13 is secured at a point to place such pinion between the bearing portions 14 and permit it to engage the toothed portion of the rack-bar. As a means for operating the pinion 13 its spindle 15 has its upper end portion provided with a double ratchet P—that is to say, it is provided with a ratchet-wheel, which is secured upon the spindle and formed with two annular series 16 and 17 of ratchet-teeth, the said two series of teeth being respectively adapted for right and left pawls. As a means for operating the pawls, which are provided for engaging the double ratchet-wheel, a vibratory hand-lever Q is supported at one end to swing about the vertical axis of the spindle 15, and this hand-lever is provided with a double-armed pawl R, having one portion of its arms adapted for engagement with the ratchet-teeth 16 and having its opposite arm adapted for engagement with ratchet-teeth 17. This double-armed pawl is pivoted, as at 18, upon the vibratory lever Q and is connected by a jointed rod or link connection S with a thumb-latch 19 on the lever. A portion of the rod or link connection S works through guide-bearings 20 on the lever and is provided with a stop or collar 21, forming an abutment for one end of a spring 22. It has its opposite end arranged to bear against one of the guide-bearings 20, as in Figs. 5 and 6. When the thumb-latch 19 is in the position shown in Fig. 5, one of the pawl-arms will be in position to engage with one set of the ratchet-teeth, and the spring 22 will be compressed, whereby a vibratory movement imparted to lever Q will operate the double ratchet-wheel with a step-by-step movement, so as to cause the slide O to shift toward one side of the machine. In order to cause this slide O to shift toward the opposite side of the machine, the operator will swing the thumb-latch 19 away from the hand-lever, whereby the spring will operate to throw the opposite arm of the pawl in engagement with the other set of the ratchet-teeth. In order to prevent back movement on the part of the ratchet while it is being operated and to lock it into position after the adjustment has been accomplished, one end of the lever Q is provided with a double-armed locking-pawl T, having one arm for engaging one set and its opposite arm for engaging the other set of the ratchet-teeth. The locking-pawl T is suitably connected with the locking-pawl R—as, for example, a rod 23, attached to the operating-pawl R, is provided with guide-bearings 24 for a slide-rod 25, which is attached to the locking-pawl T and subject to a spring 26, arranged between the guide-bearings 24, with one end engaging one of said guide-bearings and its opposite end engaging a suitable stop or the like on the slide-rod 25.

In order to laterally shift the support or carrier F for the scraper-blade when the bearing O is shifted toward either side of the machine, suitable power-transmitting connection is provided between the slide or bearing O and the support or carrier for the scraper-blade, a simple and effective arrangement being a link U, Fig. 2, pivotally connected at one end with the lower portion of the bearing O and similarly connected at its opposite lower end with a portion of a carrier F—for example, with a cross-bar 25, secured to and forming a portion of said carrier.

In Fig. 1 the hand-lever Q is arranged to extend forwardly from the rack-bar, so as to place its handle N within convenient reach of a driver occupying the seat 26; but, if preferred, the hand-lever could be extended back, so as to be available to an attendant standing upon the platform L, it being observed that when thus arranged some slight changes in the organization of parts of the machine not herein specifically described could easily be made, so as to provide suitable space or clearance for the hand-lever.

When the reciprocative operating member, such as the vibratory lever Q, is actuated for the purpose of operating the pinion 13, the said lever also shifts laterally, as it is fulcrumed upon the slide O, and hence its fulcral bearing shifts with the said slide. Broadly considered, the shifting bearing O carries a pinion which engages the rack for the purpose of moving such bearing when the pinion is operated, and said pinion is operated by a step-by-step movement, which is in turn actuated by a reciprocative member available to an attendant upon the machine whether such attendant be upon the driver's seat or upon the rear platform.

With further reference to the oscillatory member for swinging the rear-axle sections or portions it will be seen that they are connected with the oscillatory member by independent self-adjusting power-transmitting connections, so that when the oscillatory member is actuated one of these power-transmitting connections will have a yielding or self-adjusting action with reference to one rear wheel, while the other will have an independent yielding or self-adjusting action with reference to the opposite wheel.

What I claim as my invention is—

1. In a machine for making and repairing roads, a pair of independent, swinging, longitudinally-adjustable axle-sections for the rear wheels having pivotal connections with the body-frame respectively at opposite sides of a point between the rear wheels; and an oscillatory member having independent self-adjusting power-transmitting connections with the swinging extensible rear-axle section.

2. In a machine for making and repairing roads, a pair of independent, swinging, longitudinally-adjustable axle-sections for the rear wheels having pivotal connections with the body-frame respectively at opposite sides of a point between the rear wheels; an oscillatory member supported upon the body-frame and having self-adjusting power-transmitting connections with the swinging extensible rear-axle sections; and a rotary shaft for operating such oscillatory member.

3. In a machine for making and repairing roads, a wheeled body-frame provided with a scraper-blade; a pair of horizontally-swinging axle boxes or housings respectively pivoted at opposite sides of the body-frame, and axle portions having longitudinal shifting connections with such axle boxes or housings to form longitudinally-adjustable rear-axle portions, an oscillatory member supported to turn about a vertical axis between the two adjustable rear-axle portions and having self-adjusting power-transmitting connections with the swinging housings or axle-boxes.

4. In a machine for making and repairing roads, a wheeled body-frame provided with a scraper-blade; independent longitudinally-adjustable, swinging rear-axle portions; and a double-armed oscillatory member for swinging such axle portions having its arms respectively connected with one and the other of the two swinging rear-axle portions by self-adjusting power-transmitting connections.

5. In a machine for making and repairing roads, a wheeled body-frame having a transversely-arranged rack-bar secured thereto; a member supported upon and arranged to shift along the transversely-arranged rack-bar; a pinion connected with said shifting member and arranged to engage the rack-bar; a device for operating the pinion; a scraper-blade supported for movement toward opposite sides of the machine; and power-transmitting connection between the scraper-blade and said shifting member which is supported upon the rack-bar.

6. In a machine for making and repairing roads, a wheeled body-frame having a transversely-arranged rack-bar secured thereto; a slide supported on and arranged to shift along the rack-bar; a pinion mounted upon the slide; a device for operating the pinion; a scraper-blade; a laterally-movable carrier for the scraper-blade; and a connecting-rod between the carrier and the slide.

7. In a machine for making and repairing roads, a wheeled body-frame provided with a transversely-arranged rack; a bearing-support to shift along the rack and provided with a pinion by which the rack is engaged; a step-by-step-movement device for operating the pinion in opposite directions in alternation; a reciprocative member for actuating the step-by-step-movement device; a scraper-blade supported for shift toward opposite sides of the machine; and power-transmitting connection between the scraper-blade and the shifting bearing which carries the pinion.

8. In a machine for making and repairing roads, a wheeled body-frame having a transversely-arranged rack secured thereto, and provided with a scraper-blade supported for side shift; a slide supported upon the rack-bar and provided with a pinion engaging the rack-bar; a double ratchet secured to the pinion and having two sets of teeth respectively right and left; a vibratory lever and a right-and-left pawl device arranged upon such lever and adapted for engaging the sets of ratchet-teeth in alternation.

9. In a machine for making and repairing roads, a wheeled body-frame having a transversely-arranged rack secured thereto, and provided with a scraper-blade supported for side shift; a slide supported upon the rack-bar and provided with a pinion arranged to engage the rack; a double ratchet secured to the pinion and having two sets of teeth respectively right and left; a vibratory lever provided with a double-armed pawl for engaging the two sets of ratchet-teeth in alternation; a thumb-latch pivoted to the lever and connected with the double-armed pawl; a spring arranged in opposition to the movement of the thumb-latch in one direction; and power-transmitting connection between the scraper-blade and the slide.

10. In a machine for making and repairing roads, a wheeled body-frame having a rack-bar secured thereto, and carrying a scraper-blade arranged for side shift; and a device for shifting the scraper-blade comprising a slide supported upon the rack-bar and connected with the scraper-blade; a pinion on the slide arranged to engage the rack-bar; a double pawl P on the pinion; a double-armed ratchet for operating the pawl; a hand-lever supporting the double-armed pawl; and a double-armed locking-pawl T also arranged upon the hand-lever.

11. In a machine for making and repairing roads, a wheeled body-frame having a transversely-arranged rack-bar secured thereto; clevis-shaped slide supported upon the rack-bar and having upper and lower portions affording bearings for a spindle; a pinion secured upon a vertical spindle and engaging the toothed portion of the rack-bar, said pinion being arranged between said upper and lower bearing portions and having its spindle engaging therein; a ratchet secured upon the spindle; and a pawl device for actuating the ratchet.

ARTHUR CAMERON.

Witnesses:
CHARLES G. PAGE,
OTTILIE C. FREIBERG.